United States Patent
Park et al.

(10) Patent No.: US 9,440,700 B2
(45) Date of Patent: Sep. 13, 2016

(54) BODY FRAME FOR BICYCLE

(71) Applicant: WIN & WIN Co., Ltd., Anseong (KR)

(72) Inventors: Dong Won Park, Seoul (KR); Ung Je Choi, Anseong (KR)

(73) Assignee: WIN & WIN CO., LTD, Anseong (KR)

( * ) Notice: Subject to any disclaimer, the term of this patent is extended or adjusted under 35 U.S.C. 154(b) by 0 days.

(21) Appl. No.: 14/716,531

(22) Filed: May 19, 2015

(65) Prior Publication Data

US 2015/0344095 A1   Dec. 3, 2015

(30) Foreign Application Priority Data

May 27, 2014  (KR) ......................... 10-2014-0063512

(51) Int. Cl.
    *B62K 3/04*      (2006.01)
    *B62K 19/16*    (2006.01)
    *B62K 3/02*      (2006.01)

(52) U.S. Cl.
    CPC ................. *B62K 19/16* (2013.01); *B62K 3/02* (2013.01); *B62K 3/04* (2013.01)

(58) Field of Classification Search
    CPC ......... B62K 19/16; B62K 19/02; B62K 3/04
    USPC ....................................................... 280/281.1
    See application file for complete search history.

(56) References Cited

U.S. PATENT DOCUMENTS

| | | | | |
|---|---|---|---|---|
| 4,437,679 A | * | 3/1984 | Campagnolo | B62K 19/02 138/141 |
| 5,018,758 A | * | 5/1991 | Klein | B62K 19/06 280/281.1 |
| 5,236,212 A | * | 8/1993 | Duehring | B62K 19/30 280/281.1 |
| 5,273,303 A | * | 12/1993 | Hornzee-Jones | B62K 19/16 280/274 |
| 5,624,519 A | * | 4/1997 | Nelson | B29C 70/446 156/245 |
| 6,012,733 A | | 1/2000 | Rafoth | |
| 6,375,210 B1 | * | 4/2002 | Lam | B62K 19/18 280/279 |
| 6,896,006 B2 | * | 5/2005 | Lindsay | B29C 70/446 138/143 |
| 7,574,074 B1 | | 8/2009 | Huang | |
| 7,793,959 B2 | * | 9/2010 | Vandermark | B29C 65/7802 280/281.1 |
| 7,900,948 B2 | * | 3/2011 | Lewis | B62K 19/22 280/276 |
| 8,210,554 B2 | * | 7/2012 | Guzik | B62K 19/16 280/274 |
| 8,991,848 B2 | * | 3/2015 | Groendal | B62K 3/04 280/274 |
| 9,022,407 B2 | * | 5/2015 | Senechal | B62K 19/02 280/281.1 |

(Continued)

FOREIGN PATENT DOCUMENTS

| | | |
|---|---|---|
| JP | 2002-225773 A | 8/2002 |
| JP | 2005-132221 A | 5/2005 |
| JP | 2006-123699 A | 5/2006 |

(Continued)

*Primary Examiner* — Kevin Hurley
*Assistant Examiner* — Michael Stabley

(57) ABSTRACT

Disclosed herein is a body frame for a bicycle which is able to provide higher strength in such a way to use a carbon material even when the outer diameters of a top tube, a bottom tube, a seat tube, a chain tube, etc. have the thickness of a body frame of a classical bicycle, while relatively reducing the weight of the body frame. For this, the body frame for a bicycle according to the present invention is configured in such a way that each of the top tube, the bottom tube and the seat tube is made in a circular shape wherein the outer diameters are same from one end to the other end of each tube, and the flesh thickness of each tube is relatively thicker at the other end portion than one end portion, and each tube is made of a carbon material.

8 Claims, 6 Drawing Sheets

(56) References Cited

U.S. PATENT DOCUMENTS

| | | | |
|---|---|---|---|
| 2006/0038375 A1* | 2/2006 | Parkin | B62K 19/16 280/274 |
| 2006/0284394 A1* | 12/2006 | Chamberlain | B62K 19/00 280/283 |
| 2010/0225090 A1* | 9/2010 | Cusack | B62K 3/04 280/281.1 |

FOREIGN PATENT DOCUMENTS

| | | |
|---|---|---|
| JP | 2010-064508 A | 3/2010 |
| KR | 1994-0008585 B1 | 9/1994 |
| KR | 20-0163166 Y1 | 12/1999 |
| KR | 10-0938175 B1 | 1/2010 |
| KR | 10-2012-0028549 A | 3/2012 |
| KR | 10-1337593 B1 | 12/2013 |

* cited by examiner

BODY FRAME FOR BICYCLE

TECHNICAL FIELD

The present invention relates to a body frame for a bicycle, and in particular to a body frame for a bicycle which is able to provide higher strength in such a way to use a carbon material even when the outer diameters of a top tube, a bottom tube, a seat tube, a chain tube, etc. have the thickness of a body frame (in case where the body frame is made of a metallic circular tube) of a classical bicycle, while relatively reducing the weight of the body frame.

BACKGROUND ART

A bicycle, which is used as one of land transportation means, is basically driven by a user's driving force, so it is very useful in terms of environment pollution prevention and energy saving. The bicycle may contribute to enhancing a user's physical strength, so the bicycle is very popular since it can used as a leisure activity tool. More specifically, the bicycle may be used as a transportation means and a sport or leisure tool. Such a bicycle may be categorized into many different types based on the purpose of use, structure, material, driving principle, etc.

In terms of the purpose of use, the bicycle may be categorized into a common type, a racing type, a MTB type, a leisure type, etc. In case of the common type, the bicycle may be categorized into a bicycle for one user, a bicycle for two or more than two users, and a bicycle for freight.

In terms of the structure, the bicycle may be categorized into various types based on the reference of categorization. For example, the bicycle may be categorized into a folding bicycle and a non-folding bicycle based on the presence of a foldable body.

In addition, the bicycle may be categorized based on the materials of the body frame, for example, a cold-rolled steel plate, a stainless steel, a chrome-molybdenum steel, aluminum, titanium, magnesium, a carbon fiber, etc. In particular, the weight of the material of the body frame accounts for almost the total weight of the bicycle. For example, assuming that the inclusion ratio of the chrome-molybdenum steel is 100, the ratio of titanium is 50, the ratio of aluminum is 34, and the ratio of carbon is 18, which means that the bicycle having a body frame made of a carbon material is lighter than the bicycle made of other materials.

As mentioned above, the bicycle may be categorized into a variety of types based on the reference of categorization. For the sake of easier understanding of the present invention, the bicycle may be categorized into a classical type bicycle and a modern type bicycle based on the outer appearance of the body frame. Throughout the descriptions of the present invention, the bicycle will be roughly categorized into a classical type bicycle wherein a head tube, a top tube, a bottom tube, a seat tube, a rear tube, a chain tube, etc. which are all belonging to the body frame of the bicycle are made of circular pipes, and the connection portions of each tube are welded or connected using a separate connection member, and a modern type bicycle wherein the diameter or thickness of each tube belonging to the body frame is relatively larger or thicker than each of the tubes of the classical bicycle, and each tube is configured in a variety of designs, not in a circular pipe shape. This categorization is made based on the facts that the body frame of the classical bicycle is mainly made of metallic circular pipes wherein iron is contained as a main composition, and the body frame of the modern style bicycle is mainly made of new materials, for example, a carbon material, based on the purpose of use, so the modern style bicycle can be made in various designs.

FIG. 1 is a view illustrating an example of a conventional classical type bicycle 10. There are provided a top tube 12, a bottom tube 13, a seat tube 14, etc. which form a body frame 11. The diameters of such tubes may be minutely different, but they are mainly made of circular pipes. Such a classical type bicycle is being used as a common type or racing type bicycle rather than a MTB or leisure type bicycle. In particular, the bicycle wherein the body frame 11 is made of a metallic material, for example, steel, aluminum, etc. used as a main composition.

FIG. 2 is a view illustrating an example of the conventional modern type bicycle 20. The top tube 22, the bottom tube 23, the seat tube 24, etc. which form the body frame 21 have different thicknesses. Such tubes all are integrally molded or partially molded and are assembled through a separate assembling process rather than the tubes are manufactured by connecting circular pipes. In particular, the above modern type bicycle mainly corresponds to the MTB or leisure bicycle wherein the body frame 21 is made of a carbon material.

As illustrated in FIGS. 1 and 2, the classical type bicycle 10 and the modern type bicycle 20 have key differences in the outer diameters (or thicknesses) of each tube belonging to the body frames 11 and 21. More specifically, each of the tubes 12, 13 and 14 of the classical type bicycle 10 have relatively smaller outer diameters (or thicknesses) as compared with the tubes 22, 23 and 24 of the modern type bicycle 20. Since the body frame 11 of the classical type bicycle 10 is made of metallic circular pipes, even when the diameters are large, the strengths are high, whereas the body frame 21 of the modern type bicycle 20 is mainly manufactured through the molding process by using a carbon material, so the outer diameters (or thicknesses) should be relatively larger so as to secure enough strength.

Of course, the reason why the tubes 22, 23 and 24 of the body frame 21 of the modern type bicycle 20 are made thicker is not because of their materials. Such tubes should be made thicker in an effort to provide more active, strong and stylus impressions when designing the MTB or leisure bicycle.

Meanwhile, as illustrated in FIG. 1, a top tube 12 and a bottom tube 13 are formed in a triangular shape and about a seat tube 14 at a front end of the body frame of the classical type bicycle, and a rear tube 15 and a chain tube 16 are formed in a triangular shape at a rear end thereof, which consequently looks like a diamond shape. In such a body frame 11, relatively more torsion stress may concentrate at a front portion 12a of the top tube 12, a front portion 13a of the bottom tube 13, a lower portion of the seat tube 14, etc while a user is riding the bicycle. As illustrated in FIG. 2, a front portion 22a of the top tube 22, a front portion 23a of the bottom tube 23, and a lower portion of the seat tube 24 are made relatively thicker in the body frame of the morn type bicycle.

Since the classical type bicycle in general is made by connecting circular metallic pipes, the tubes belonging to the body frame has roughly same outer diameters at the front and rear portions (or upper and lower portions). In addition, in case of the modern type bicycle wherein the body frame is made using a carbon material, since it is easy to make different the thicknesses of the front and rear portions (or upper and lower portions) of the tubes, the body frames can be manufactured in various designs.

So far, there has not been any trial to make a frame body of a bicycle using a carbon material while maintaining a traditional design of tubes belonging to the body frame of the bicycle. In addition, since the main frame of the classical type bicycle is made of metals, the weight is very heavy, so it is hard for the user to handle it.

PRIOR ART DOCUMENTS

Patent Documents (Patent Document 0001) Korean Patent Registration No. 10-13375933333
(Patent Document 0002) Korean Patent Publication No. 10-2012-0028549
(Patent Document 0003) Korean Patent Publication No. 1994-0008585
(Patent Document 0004) Korean Utility Model Registration No. 20-0163166
(Patent Document 0005) Korean Patent Registration No. 10-0938175
(Patent Document 0006) U.S. Pat. No. 6,012,733
(Patent Document 0007) U.S. Pat. No. 7,574,074
(Patent Document 0008) U.S. Pat. No. 7,793,959

DISCLOSURE OF THE INVENTION

Accordingly, it is an object of the present invention to provide a body frame for a bicycle wherein a top tube, a bottom tube, a seat tube, etc. which form a body frame of a bicycle are made of a carbon material, and higher strength can be obtained even though the outer diameter of each tube corresponds to the thickness of a body frame of a classical type bicycle.

It is another object of the present invention to provide a body frame for a bicycle which makes it possible to greatly reduce the total weight of a bicycle, while maintaining an outer appearance of a traditional style bicycle which has been mainly manufactured using a metallic material.

It is further another object of the present invention to provide a body frame for a bicycle which can more reinforce the portions, for example, at a top tube, a bottom tube, a seat tube, etc. where torsion stress concentrates.

To achieve the above objects, the present invention may be configured in the following way.

The body frame for a bicycle according to the present invention is configured in such a way that in the flesh thickness of each tube, one end is larger than the other end in a shape of a pipe wherein the outer diameters from one end to the other end of each of the top tube, the bottom tube and the seat tube are same, and each tube is made of a carbon material.

The body frame for a bicycle according to an exemplary embodiment of the present invention may be configured in such a way that the flesh thickness of each of the top tube, the bottom tube and the seat tube is gradually or step by step getting thicker from one end to the other end.

In the body frame for a bicycle according to an exemplary embodiment of the present invention, the flesh thickness of the top tube may be configured in such a way that the front portion is thicker, the flesh thickness of the bottom tube may be configured in such a way that the front portion (top) is thicker, and the flesh thickness of the seat tube may be configured in such a way that the lower portion connected to the rear portion (bottom) is thicker.

The body frame for a bicycle according to the present invention may be configured in such a way that a filler is filled in the inside of the portion where the flesh thickness is thicker in at least one among the top tube, the bottom tube and the seat tube.

The filler in the body frame for a bicycle according to an exemplary embodiment of the present invention is an epoxy resin in which aramid fiber is impregnated.

The body frame for a bicycle according to an exemplary embodiment of the present invention may be configured in such a way that the outer diameter of the bottom tube is larger than the outer diameter of the seat tube, and the outer diameter of the seat tube is thicker than the outer diameter of the top tube.

The body frame for a bicycle according to an exemplary embodiment of the present invention may be configured in such a way that the flesh thickness of each of the tubes is gradually getting thicker or step by step from one end to the other end in a pipe shape wherein the outer diameter of each of the top tube, the bottom tube and the seat tube is in a scope of 15 mm to 35 mm from one end to the other end of each tube.

ADVANTAGEOUS EFFECTS

According to the body frame for a bicycle according to the present invention, the top tube, the bottom tube and the seat tube belonging to the body frame similar with the conventional classical type body frame for a bicycle are formed in a shape of a circular pipe having the same outer diameters from a front end (or top) to a rear end (or bottom), and compared with the top tube, the bottom tube and the seat tube belonging to the body frame for a classical type bicycle, even though the outer diameters of each tube are similar with each other, each tube is made of a carbon material, so it is possible to manufacture a bicycle relatively lighter than a conventional classical type bicycle.

In addition, the body frame for a bicycle according to the present invention has advantages since the flesh thickness of the portions where the torsion stresses concentrate, is relatively thicker while maintaining the outer appearance of the body frame of a conventional classical type bicycle, so the stability of the entire configuration can be obtained.

In particular, the body frame for a bicycle according to the present invention may change the long term paradigm where the body frame for a classical type bicycle should be made of only metal materials.

BRIEF DESCRIPTION OF THE DRAWINGS

The present invention will become better understood with reference to the accompanying drawings which are given only by way of illustration and thus are not limitative of the present invention, wherein.

MODES FOR CARRYING OUT THE INVENTION

Figure 1:
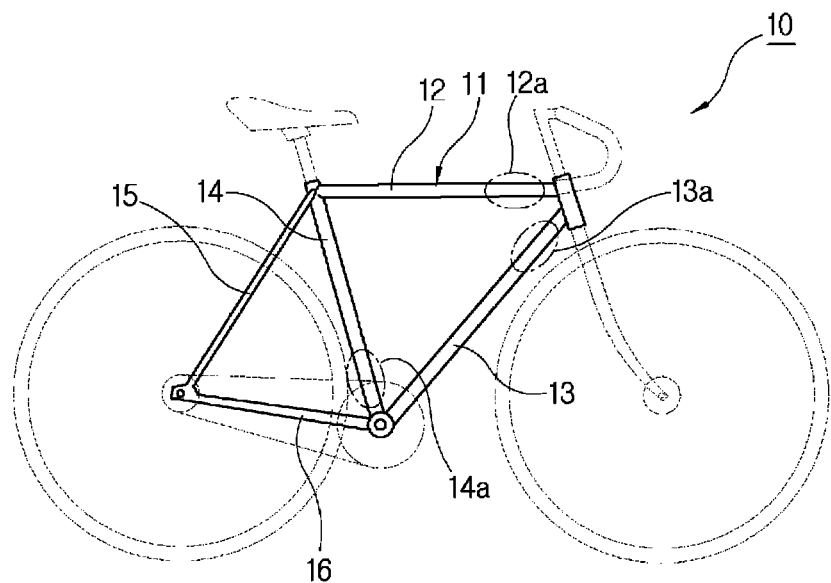
FIG. 1 is a view for describing a configuration of a conventional classical type bicycle.
Figure 2:
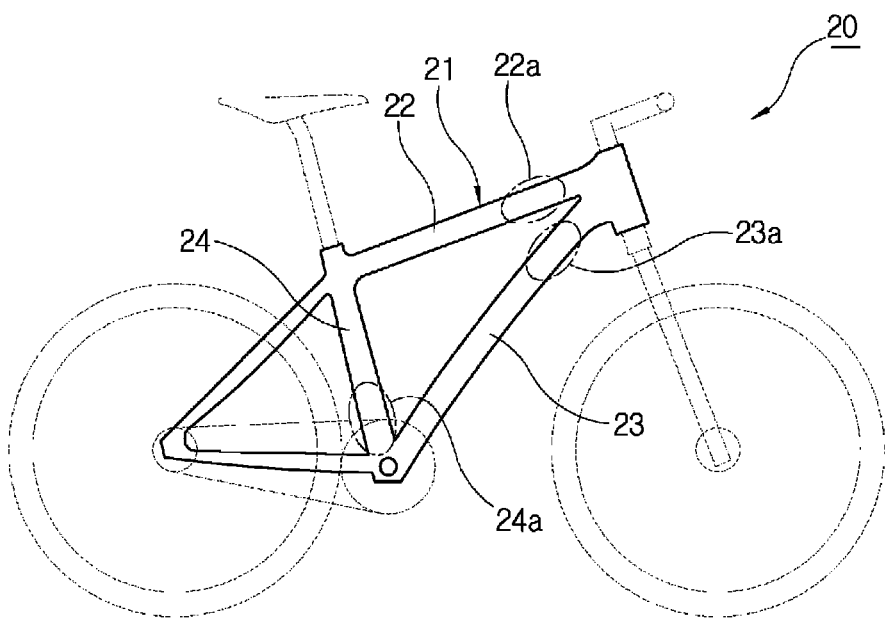
FIG. 2 is a view for describing a configuration of a conventional modern type bicycle.

The exemplary embodiments of the body frame for a bicycle according to the present invention will be described with reference to the accompanying drawings. In the drawings, reference number 10 represents a body frame according to an exemplary embodiment of the present invention.

Figure 3:
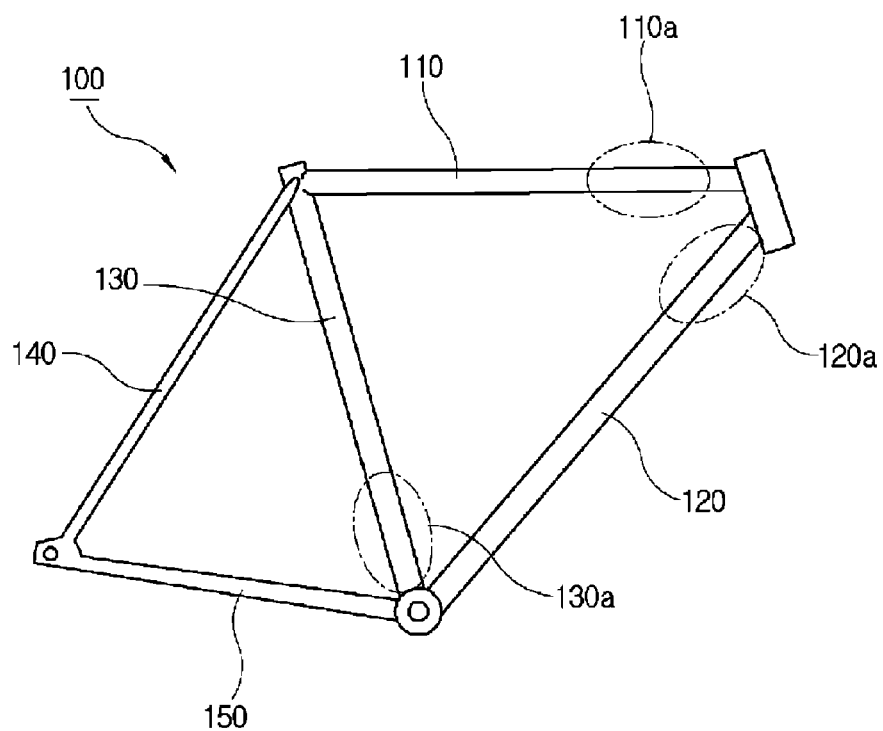
FIG. 3 is a view for describing a configuration of a body frame for a bicycle according to an exemplary embodiment of the present invention.

As illustrated in FIG. 3, the body frame 100 of the present invention includes a top tube 110, a bottom tube 120 and a seat tube 130 which are aligned in a triangular shape. The tubes 110, 120 and 130 can apply to a classical bicycle which has a pipe shape wherein the outer diameters of the tubes 110, 120 and 130 are same from the front ends (or tops) to the rear ends (or bottoms). In particular, the top tube 110, the bottom tube 120, the seat tube 130, the rear tube 140 and the chain tube 150 all are aligned to form a diamond shape, thus obtaining the outer appearance of the classical bicycle. In addition, the front end of the top tube 110 and the front end of the bottom tube 12 are integrally connected to the head tube (not illustrated in the drawing) which connects a handle and a fork.

The top tube 110 is aligned almost horizontal to have the outer appearance of the classical bicycle or the front end of the top tube 110 is aligned higher than the rear end, and the front end (top) of the bottom tube 120 has an acute angle with respect to the front end of the top tube 110, and the rear end (top) of the seat tube 130 is aligned to have an acute angle at the rear end of the top tube 110, and the rear end (bottom) of the bottom tube 120 is aligned to have an acute angle with respect to the front end (bottom) of the seat tube 130. Namely, the tubes belonging to the body frame 100 are aligned in such a way the top tube 110 and the bottom tube 120 are arranged in a triangular shape with respect to the seat tube 130, and the rear tube 140 and the chain tube 150 are arranged in a triangular shape, thus configuring the whole structures in a diamond shape which is similar with the conventional traditional bicycle.

In particular, the top tube 110, the bottom tube 120 and the seat tube 130 belonging to the body frame 100 for a bicycle according to an exemplary embodiment of the present invention are made of a carbon material. Therefore, different from the conventional modern type bicycle, the front ends (tops) to the rear ends (bottoms) of the tubes 110, 120 and 130 are formed in a circular pipe shape which has the same outer diameter. At this time, the tubes 110, 120 and 130 are configured in such a way that the flesh thicknesses of the end portions where relatively more torsion stress concentrates is made thicker than the flesh thickness of the end portions where relatively less torsion stress concentrates. Here, the portion where relatively more torsion stress concentrates, as illustrated in the drawings, are the front portions 110a and 120a in case of the top tube 110 and the bottom tube 120, and are the lower end portion 130a in case of the seat tube.

In order for the portions where more torsion stress concentrates to be reinforced while maintaining the outer appearance of the body frame for a classical type bicycle, the tubes 110, 120, and 130 belonging to the body frame 100 are configured in such a way that the flesh thickness is gradually getting thicker or step by step in the direction from one end to the other end. More specifically, the tubes 110, 120 and 130 have the same outer diameters at the front ends and the rear ends (or tops and bottom), however the inner diameters thereof are gradually or step by step getting smaller in the direction from one end to the other end. In order for the flesh thicknesses to gradually get thicker in the direction from one end to the other end of each of the tubes 110, 120 and 130, a predetermined thickness can be obtained by the method of adjusting the thickness of the carbon seat, the aligning direction of the carbon seat and the number of stacked layers of the stacking carbon seats during the process where the circular pipe shapes are made using the materials, for example, carbon seats and epoxy resin. In addition, in order for the flesh thicknesses to step by step get thicker from one end to the other end, the flesh thicknesses of the neighboring sections may be made different by adjusting the number of stacked folds of the carbon sheets during the process where a circular pipe is manufactured using the carbon sheets.

Figure 4:
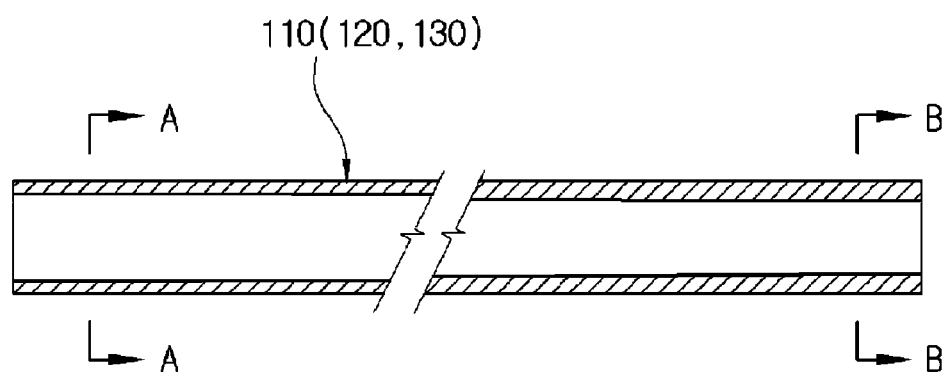
FIG. 4 is a view for describing a configuration of a tube which applies to a body frame according to an exemplary embodiment of the present invention.
Figure 5:
FIG. 5 is a cross sectional view taken along lines A-A and B-B in FIG. 4.

FIG. 4 is a view illustrating a configuration where the flesh thicknesses of the tubes 110, 120 and 130 belonging to the body frame 100 according to an exemplary embodiment of the present invention are gradually getting thicker in the direction from one end to the other end, and FIG. 5 is a cross sectional view taken along line A-A and B-B in FIG. 4. As illustrated in FIG. 5, the cross sectional structures of the tubes 110, 120 and 130 are circular.

Figure 6:
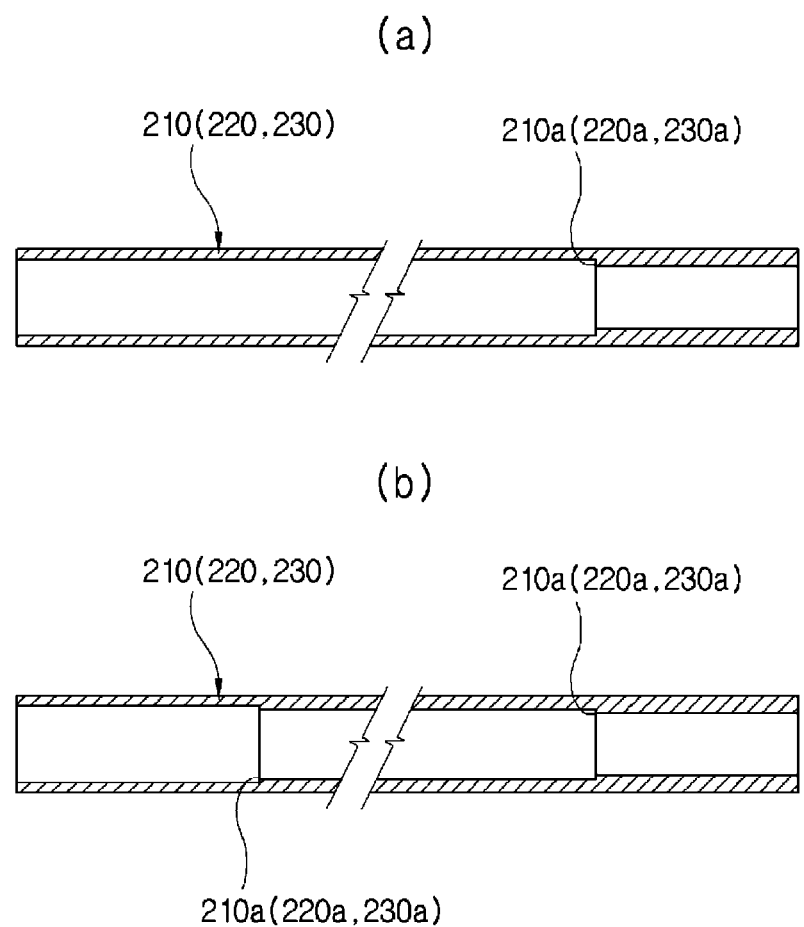
FIG. 6 is a view for describing a configuration of a tube which applies to a body frame according to another exemplary embodiment of the present invention.

FIG. 6 is a view illustrating a configuration where the flesh thicknesses of one end of each of the top tube 210, the bottom tube 220 and the seat tube 230 belonging to the body frame according to another exemplary embodiment of the present invention are gradually or step by step getting thicker than the other end of each thereof, wherein (a) represents the occasion where the flesh thicknesses of the tubes 210, 220 and 230 have two-step differences, and (b) represents the occasion where the flesh thicknesses of the tubes 210, 220 and 230 have tree-step or more than three-step differences. In this way, since the shoulders 210a, 220a and 230a are formed on the inner surfaces of the top tube 210, the bottom tube 220 and the seat tube 230, intensive reinforcing may be conducted at the portions which need relatively more strength, thus maintaining the outer diameters of each tube thinner.

Figure 7:
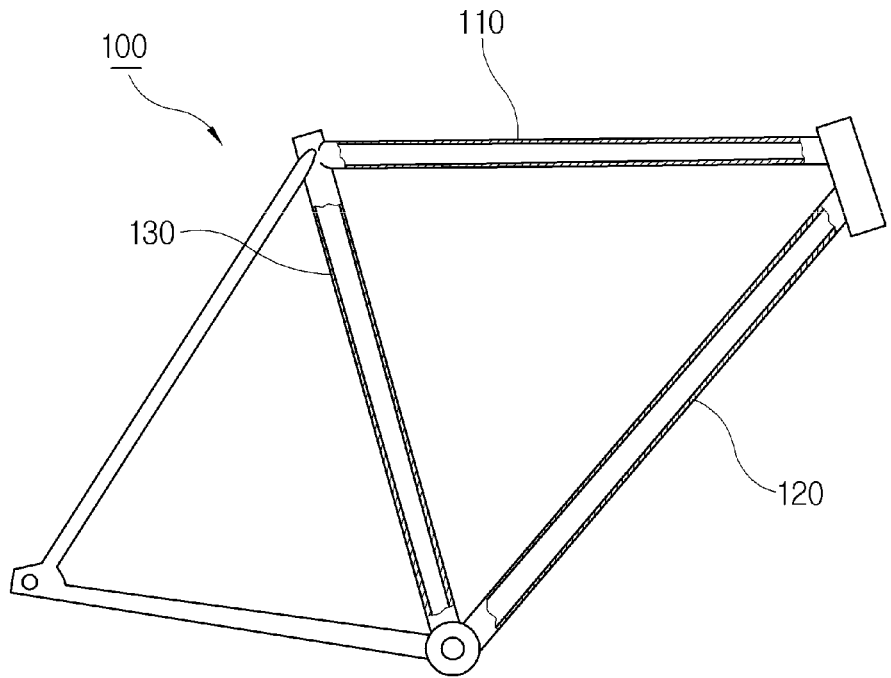
FIGS. 7 to 10 are views of various exemplary embodiments of the present invention.
Figure 8:
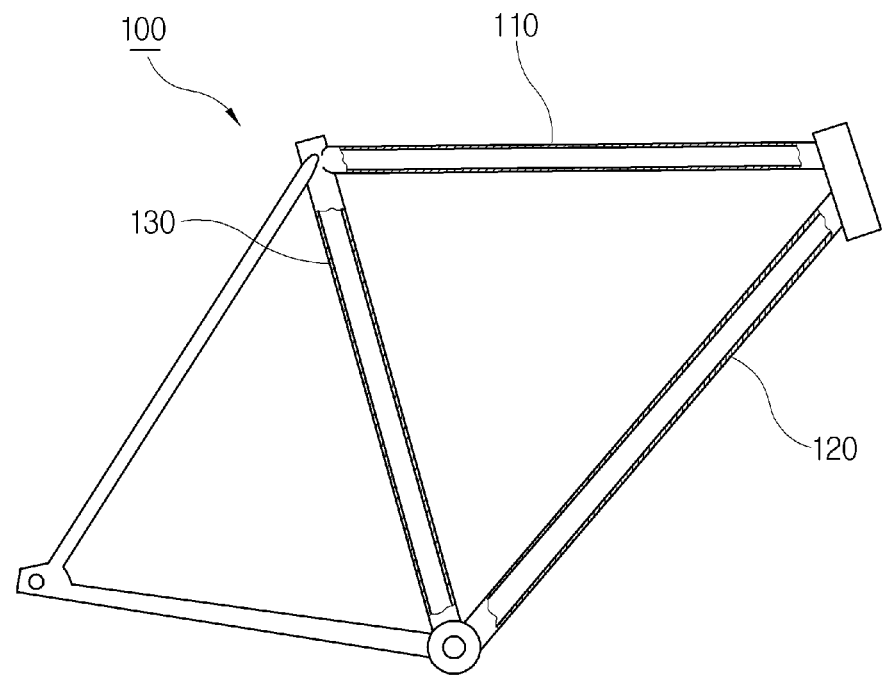
Figure 9:
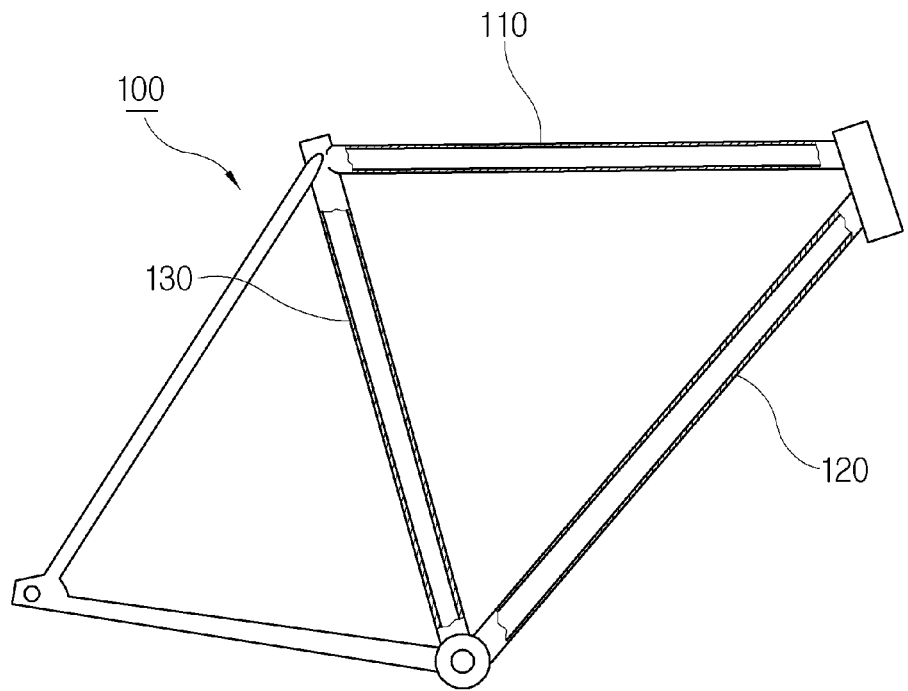
Figure 10:
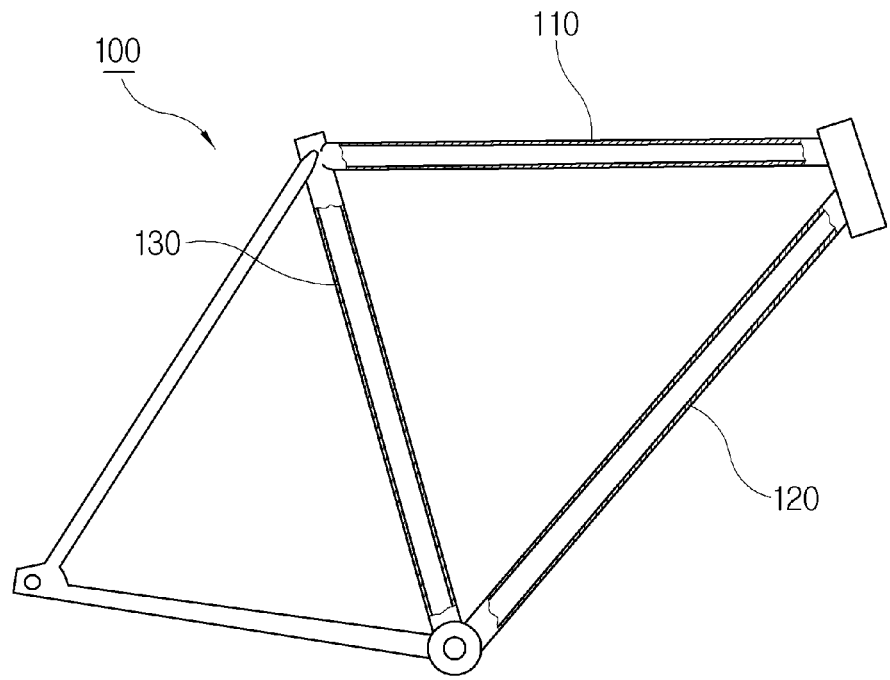

Meanwhile, in the body frame 100 according to an exemplary embodiment of the present invention, the top tube 110, the bottom tube 120 and the seat tube 130, as illustrated in FIG. 7, may be configured in such a way that the outer diameters of the tubes 110, 120 and 130 are same, but the flesh thicknesses thereof are gradually getting thicker from one end to the other end of each tube. As illustrated in FIG. 8, such a configuration may apply to only the bottom tube 120, and as illustrated in FIG. 9, such a configuration may apply to only the bottom tube 120 and the seat tube 130, and as illustrated in FIG. 10, such a configuration may apply to only the top tube 110 and the bottom tube 120.

Figure 11:
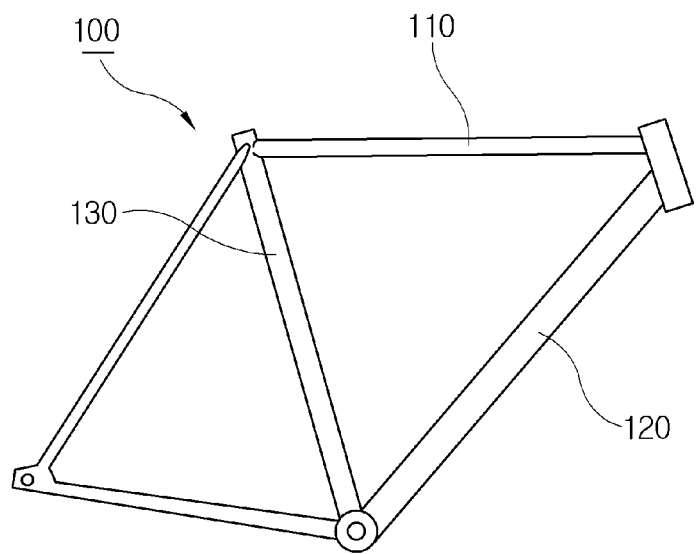
FIG. 11 is a view for describing a configuration of a body frame according to another exemplary embodiment of the present invention.

As illustrated in FIG. 11, the body frame 100 for a bicycle according to the present invention may be configured in such a way that the outer diameters of the bottom tube 120 and the seat tube 130 are relatively larger than the outer diameter of the top tube 110, and the outer diameter of the bottom tube 120 is relatively larger than that the outer diameter of the seat tube 130.

Meanwhile, the tubes 110, 120 and 130 of the body frame 100 which apply to various exemplary embodiments of the present invention have the outer diameters of 15 mm to 35 mm in circular pipe structures to look like the body frame of a classical type bicycle, and the tubes may be manufactured using carbon sheets through the separate forming process, and then may be integrated through the assembling process.

Figure 12:
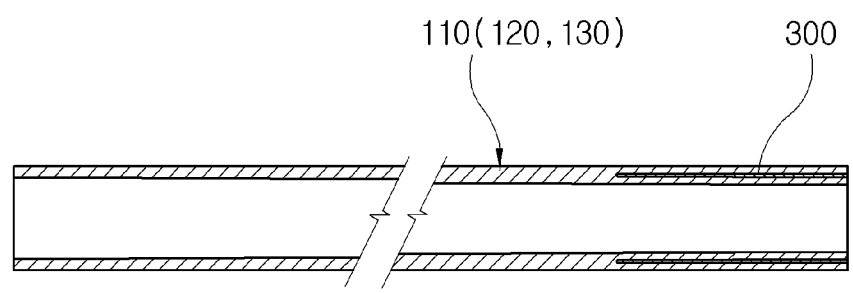
FIG. 12 is a view illustrating a state where a filler is filled into a portion of a tube belonging to a body frame according to further another exemplary embodiment of the present invention.

FIG. 12 is a view illustrating a body frame for a bicycle according to another exemplary embodiment of the present invention. A filler 300 may be filled in a portion where the flesh thickness of one or more than one among the top tube 110, the bottom tube 120, and the seat tube 130 belonging to the body frame 100 is thicker. At this time, the filler 300 may be an epoxy resin in which aramid fiber is impregnated. If the epoxy resin in which aramid fiber is impregnated is used, impact strength, fatigue resistance, etc. can be enhanced.

Here, the filler 300 may be filled though a process where the filler is filled in between the carbons of the sheet type positioned at the upper and lower portions during the forming in the circular pipe shape using a carbon material or a process where the filler is filled in a predetermined portion where the flesh is reduced while being formed in the pipe shape using a carbon material.

Meanwhile, FIG. 12 is a view illustrating a configuration wherein the filler 300 is filled in a predetermined portion of one side of each of the top tube 110, the bottom tube 120 and the sheet tube 130 belonging to the body frame 100, however such a configuration may apply to one or two tubes among the top tube 110, the bottom tube 120 and the seat tube 130.

In this way, even though part or all of the top tube 110, the bottom tube 120 and the seat tube 130 belonging to the body frame 100 is manufactured using the a carbon material as the main material, it is possible to obtain an outer appearance of the body frame of the conventional classical type bicycle which in general is made of metallic materials.

Since the body frame for a bicycle which is categorized into a classical type is made of circular pipes which uses metals as key materials, the thickness of each tube belonging to the body frame in general is made relatively thinner, whereas carbon is used when manufacturing the body frame for a modern type bicycle, for example, a MTB or leisure bicycle, so the thickness of each tube belonging to the body frame is made relatively thicker.

Therefore, in the body frame 100 for a bicycle according to the present invention, even though each tube is made of a carbon material, the outer diameter (or thickness) is relatively smaller as compared with the body frame of the modern style bicycle, it becomes possible to obtain an outer appearance of the body frame which applies to the classical type bicycle.

In this way, the whole outer appearance of the body frame 100 can have the configuration which may be made by connecting the circular pipes like in the body frame of the classical type bicycle.

In particular, since the total weight of the classical type bicycle to which the body frame 100 applies is relatively lighter than the classical type bicycle to which a conventional body frame made of metallic materials applies, the user can easily use and care.

The exemplary embodiments of the body frame for a bicycle according to the present invention so far have been described with reference to the accompanying drawings. It should be understood that these exemplary embodiments are included in the technical concepts of the claims of the present invention. In addition, these exemplary embodiments are provided for only illustrative purposes and should not be interpreted to limit the present invention when interpreting the claims of the present invention.

What is claimed is:

1. A body frame for a bicycle comprising:
   a top tube having a shape of a circular pipe with a first outer diameter that is constant in a direction from a rear end to a front end of the top tube, the first outer diameter being within a range of 15 mm to 35 mm, the top tube having a first inner diameter that decreases gradually or step-by-step in the direction from the rear end to the front end of the top tube, the top tube being made of a carbon material;
   a bottom tube having a shape of a circular pipe with a second outer diameter that is constant in a direction from a rear end to a front end of the bottom tube, the bottom tube having a second inner diameter that decreases gradually or step-by-step in the direction from the rear end to the front end of the bottom tube, the bottom tube being made of a carbon material; and
   a seat tube having a shape of a circular pipe with a third outer diameter that is constant in a direction from an upper end to a lower end of the top tube, the seat tube having a third inner diameter that decreases gradually or step-by-step in the direction from the upper end to the lower end, the seat tube being made of a carbon material.

2. The body frame of claim 1, wherein a step is formed on an inner surface of each of the top tube, the bottom tube and the seat tube.

3. The body frame of claim 1, further comprising a filler, wherein the filler is disposed in any one of a first end portion of the top tube, a second end portion of the bottom tube, and a third end portion of the seat tube, the first end portion, the second end portion, and third end portion being proximate to the front end of the top tube, the front end of the bottom tube, and the lower end of the seat tube, respectively.

4. The body frame of claim 2, further comprising a filler, wherein the filler is disposed in any one of a first end portion of the top tube, a second end portion of the bottom tube, and a third end portion of the seat tube, the first end portion, the second end portion, and third end portion being proximate to the front end of the top tube, the front end of the bottom tube, and the lower end of the seat tube, respectively.

5. The body frame 3, wherein the filler is an epoxy resin in which aramid fiber is impregnated.

6. The body frame 4, wherein the filler is an epoxy resin in which aramid fiber is impregnated.

7. The body frame of claim 1, wherein the second outer diameter of the bottom tube is substantially the same as the first outer diameter of the top tube, and
   wherein the third outer diameter of the seat tube is substantially the same as the first outer diameter of the top tube.

8. The body frame of claim 1, wherein the third outer diameter of the seat tube is greater than the first outer diameter of the top tube, and
   wherein the second outer diameter of the bottom tube is greater than the third outer diameter of the seat tube.

* * * * *